United States Patent [19]

Takada

[11] Patent Number: 5,849,831
[45] Date of Patent: Dec. 15, 1998

[54] PROCESS FOR PRODUCING VINYL RESIN

[75] Inventor: Shigeki Takada, Kurashiki, Japan

[73] Assignee: Kuraray Co., Ltd., Kurashiki, Japan

[21] Appl. No.: 832,511

[22] Filed: Apr. 2, 1997

[30] Foreign Application Priority Data

Apr. 19, 1996 [JP] Japan .................................. 8-097881

[51] Int. Cl.$^6$ .................................................. C08F 2/16
[52] U.S. Cl. ......................... 524/459; 524/557; 526/202
[58] Field of Search ........................... 526/202; 524/459, 524/557

[56] References Cited

U.S. PATENT DOCUMENTS

| | | | |
|---|---|---|---|
| 4,319,012 | 3/1982 | Morningstar | 526/202 |
| 5,087,678 | 2/1992 | Noguki et al. . | |
| 5,142,004 | 8/1992 | Awano et al. | 526/202 |
| 5,349,008 | 9/1994 | Takada et al. . | |
| 5,478,900 | 12/1995 | Amano et al. . | |
| 5,502,123 | 3/1996 | Hiyama et al. . | |

FOREIGN PATENT DOCUMENTS

| | | | |
|---|---|---|---|
| 0028812 | 5/1981 | European Pat. Off. | 526/202 |
| 3048687 | 7/1982 | Germany | 526/202 |
| 44-6830 | 3/1969 | Japan | 526/202 |
| 51-18779 | 2/1976 | Japan | 526/202 |
| 53-35784 | 4/1978 | Japan | 526/202 |
| 60-231706 | 11/1985 | Japan | 526/202 |
| 3182508 | 8/1991 | Japan | 526/202 |
| WO8101005 | 4/1981 | WIPO | 526/202 |

OTHER PUBLICATIONS

Abstract 95–226213/30, Shinetsu Chem. Co., Ltd., 93.12.21, 93JP–345209.
Abstract 95–128359/17 Shinetsu Chem. Co., Ltd., 93.08.09, 93JP–217012.
Abstract 94–343279/43 Shinetsu Chem. Co., Ltd., 93.05.07, 93JP–131274.
Abstract 91–325176/44, Kuraray,19.10.90, JP–282690.
Abstract 90–211664/28, Shinetsu Chem. Co., 05.01.89, JP–000784.
Abstract 91–3202225/44, Shinetsu Chem. Co., Ind., KK., 18.01.90, JP–009056.

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

There is disclosed a process for producing a vinyl resin by suspension polymerization of a vinyl compound in the presence of a suspending agent (A) which comprises using a polymerization vessel equipped with a reflux condenser and adding a polyvinyl alcohol (B) having a degree of hydrolysis of at most 85 mol % in an amount of 0.001 to 0.5 part by weight based on 100 parts by weight of said vinyl compound when a polymerization conversion is in the range of 30 to 90%.

According to the present invention, there is provided a process for producing a vinyl resin having a high bulk density, which is excellent in anti-foaming effect against the dry foam being generated in the middle to latter period of the suspension polymerization in a polymerization vessel equipped with a reflux condenser which is excellent in productivity.

9 Claims, No Drawings

PROCESS FOR PRODUCING VINYL RESIN

BACKGROUND OF THE INVENTION

1. Field of the Invention

The present invention relates to a process for producing a vinyl resin by suspension polymerization of a vinyl compound by the use of a polymerization vessel equipped with a reflux condenser which is excellent in productivity. More particularly, it relates to a process for producing a vinyl resin characterized in that foaming is minimized in the polymerization vessel.

2. Description of the Related Arts

It is the general practice to industrially produce a vinyl resin (hereinafter referred to as "PVC") by batchwise suspension polymerization in which vinyl chloride monomer (hereinafter referred to as "VCM") is suspended in an aqueous medium in the presence of a suspending agent by using a polymerization vessel, an oil-soluble polymerization initiator is fed into the vessel and thereafter the temperature therein is raised to proceed with polymerization.

As it has been required, in recent years, to shorten the period of time needed for one batch of polymerization for the purpose of enhancing its productivity, there have been proposed a process in which a polymerization vessel equipped with a reflux condenser is employed in order to increase the removal rate of the polymerization reaction heat and a process in which a preheated aqueous medium is fed into a polymerization vessel in order to shorten the period of time for raising temperature (hereinafter referred to as "hot charge method"). However, in the case of employing a polymerization vessel equipped with a reflux condenser, there arises the problem that wet foam and dry foam are extremely generated due to the pressure drop in the vicinity of the reflux condenser, accompanying the condensation of the VCM vapor. The wet foam means the foam which is attributed mainly to polyvinyl alcohol (hereinafter referred to as "PVA") and is composed principally of water. The dry foam means the foam which is composed principally of PVC and VCM and is generated mainly in the middle to latter period of the polymerization. In the case where the wet foam and/or the dry foam are generated, the effective volume in the polymerization vessel is decreased, thereby lowering the productivity. In particular, in the case where the dry foam is generated, a scale adheres to the walls of the reflux condenser, thus making it impossible to control the temperature of the polymerization vessel.

Japanese Patent Application Laid-Open No. 180908/1990 (Hei-2) (hereinafter referred to as "public knowledge A") discloses a method in which a silicone oil such as a dimethylpolysiloxane or PVA having a low degree of hydrolysis is added to the polymerization system when the removal amount of the polymerization reaction heat in the reflux condenser is at most 10% of the total amount of the polymerization reaction heat. Japanese Patent Application Laid-Open No. 212409/1991 (Hei-3) (hereinafter referred to as "public knowledge B") discloses a method in which there are added to the polymerization system, 0.002 to 0.007 part by weight of a water-insoluble partially hydrolyzed PVA having a degree of hydrolysis of 20 to 50 mol % and a degree of polymerization of 200 to 400 based on 100 parts by weight of VCM, and 0.001 to 0.01 part by weight of an anti-foaming agent such as dimethylpolysiloxane based on the same when the removal amount of the polymerization reaction heat in the reflux condenser is at most 10% of the total amount of the polymerization reaction heat. However, both the public knowledge A and public knowledge B involve the problem that dry foam is extremely generated, thus lowering the bulk density of the objective PVC.

In the case where a reflux condenser is not used, the dry foam is not generated, but nonusage of a reflux condenser causes the problem of long polymerization time and low productivity.

Japanese Patent Application Laid-Open No. 137105/1980 (Sho-55) (hereinafter referred to as "public knowledge C") discloses the addition of an ion-modified PVA having a degree of hydrolysis of 60 to 80 mol % prior to the start of the polymerization. WO 91/15518 (hereinafter referred to as "public knowledge D") discloses the addition of an end ion-modified PVA having a degree of hydrolysis of 60 to 90 mol % prior to the start of the polymerization. Japanese Patent Application Laid-Open No. 179507/1995 (Hei-7) (hereinafter referred to as "public knowledge E") discloses a method in which there is added to the polymerization system, a water-soluble PVA having a degree of hydrolysis of 70 to 85 mol % and a degree of polymerization of 700 to 3000 when a polymerization conversion is in the range of 5 to 50%. Japanese Patent Application Laid-Open No. 53607/1995 (Hei-7) (hereinafter referred to as "public knowledge F") discloses a method in which there is added to the polymerization system, a water-soluble PVA having a degree of hydrolysis of 70 to 85 mol % and a degree of polymerization of 700 to 3000 when a polymerization conversion is in the range of 5 to 50%. Japanese Patent Application Laid-Open No. 18007/1995 (Hei-7) (hereinafter referred to as "public knowledge G") discloses a method in which there is added to the polymerization system, a water-soluble PVA having a degree of hydrolysis of 75 to 85 mol % and a degree of polymerization of 1500 to 2700 when a polymerization conversion is in the range of 30 to 60%. However, any of the public knowledge C to G involves the problem of long polymerization time and low productivity due to the nonusage of a reflux condenser.

SUMMARY OF THE INVENTION

It is a general object of the invention to provide a process for producing a vinyl resin having a high bulk density and which is excellent in anti-foaming effect against the dry foam being generated particularly in the middle to latter period of the polymerization in a polymerization vessel equipped with a reflux condenser which is excellent in productivity.

Under such circumstances, intensive research and investigation were accumulated by the present inventors in order to solve the above-mentioned problems. As a result, there was found a process for producing a vinyl resin by suspension polymerization of a vinyl compound in the presence of a suspending agent (A) which comprises using a polymerization vessel equipped with a reflux condenser and adding a polyvinyl alcohol (B) having a degree of hydrolysis of at most 85 mol % in an amount of 0.001 to 0.5 part by weight based on 100 parts by weight of said vinyl compound when a polymerization conversion is in the range of 30 to 90%.

DESCRIPTION OF THE PREFERRED EMBODIMENTS

The reflux condenser in the present invention is used for the purpose of efficiently removing the polymerization reaction heat which is generated by the suspension polymerization of a vinyl compound. That is to say, unreacted VCM vapor generated from the suspension liquid in the polymerization vessel is liquefied by the reflux condenser. The VCM liquefied in the reflux condenser is returned to the polymerization vessel, whereby the polymerization reaction heat is removed. The temperature of cooling water in the reflux condenser is usually in the range of 10° to 50° C., approximately. The temperature control in the polymerization vessel is carried out by the heat removal through the reflux condenser in combination with temperature control usually by means of a cooling jacket or a cooling coil of the polymerization vessel. The removal amount of the polymerization reaction heat in the reflux condenser is not specifically limited, but is preferably 10 to 80%, more preferably 20 to 60% of the total amount of the polymerization reaction heat.

The suspension polymerization of the vinyl compound in the present invention is carried out in the presence of a suspending agent (A) for suspension polymerization.

There is no specific limitation to the suspending agent (A) for suspension polymerization, and there is used a water-soluble polymer such as a water-soluble PVA having a degree of hydrolysis of 60 to 95 mol % and a degree of polymerization of 500 to 3600 or a water-soluble cellulose.

The water-soluble cellulose is exemplified by methyl cellulose, hydroxyethyl cellulose, hydroxypropyl cellulose and hydroxypropylmethyl cellulose. The water-soluble polymer other than the foregoing is exemplified by gelatin. Two or more kinds of these water-soluble polymers may be used in combination as well.

The amount of the suspending agent (A) for suspension polymerization to be added is not specifically limited, but is preferably 0.01 to 1.0, more preferably 0.02 to 0.2 part by weight based on 100 parts by weight of the vinyl compound.

In addition, the suspending agent (A) may be used in combination with an oil-soluble emulsifier such as sorbitan monolaurate, sorbitan trioleate, sorbitan tristearate, and ethylene oxide/propylene oxide block copolymer or a water-soluble emulsifier such as polyoxyethylene sorbitan monolaurate, polyoxyethylene glycerol oleate and sodium laurate.

In the suspension polymerization of a vinyl compound according to the present invention, 1 to 100 parts by weight of a polyvinyl ester (hereinafter referred to as "PVES") having a degree of hydrolysis of less than 60 mol % may be used as a secondary suspending agent in combination based on 100 parts by weight of the suspending agent (A). The PVES to be used as a secondary suspending agent may be an unmodified PVES, or a PVES having an ionic group such as carboxyl group at a side chain or at an end thereof in an amount of at most 10 mol %.

Various additives may be added as necessary to the suspension polymerization system in the present invention. The additives are exemplified by a polymerization regulator for degree of polymerization such as acetaldehyde, butyraldehyde, trichloroethylene, perchloroethylene and mercaptans, a polymerization inhibitor such as a phenolic compound, sulfur compound and N-oxide compound, a pH adjustor, a scale inhibitor, a crosslinking agent and a publicly known anti-foaming agent. Two or more kinds of these additives may be used in combination without limitation to the timing of addition.

The polymerization initiator to be used for the suspension polymerization of the vinyl compound in the present invention may be any of the polymerization initiators that have heretofore been used for the suspension polymerization of the vinyl compound such as vinyl chloride, and is exemplified by a percarbonate compound such as diisopropyl peroxydicarbonate, di-2-ethylhexyl peroxydicarbonate and diethoxyethyl peroxydicarbonate; a peroxyester compound such as tert-butyl peroxyneodecanate, α-cumyl peroxyneodecanate and tert-butyl peroxyneodecanate; a peroxide such as acetylcyclohexylsulfonyl peroxide and 2,4,4-trimethylpentyl-2-peroxyphenoxy acetate; and an azo compound such as 2,2-azobis(isobutyronitrile), azobis-2,4-dimethylvaleronitrile and azobis(4-methoxy-2,4-dimethylvaleronitrile). Any of these polymerization initiators may be used in combination with potassium persulfate, ammonium persulfate, hydrogen peroxide or the like.

Examples of the vinyl compound to be subjected to the suspension polymerization in the present invention include vinyl chloride alone; a mixture of monomers comprising vinyl chloride as a principal component (vinyl chloride content of at least 50% by weight) and a vinyl compound other than vinyl chloride.

Examples of the monomers that are copolymerized with vinyl chloride include a vinyl ester such as vinyl acetate and vinyl propionate; a (meth)acrylic acid ester such as methyl (meth)acrylate and ethyl (meth)acrylate; an olefin such as ethylene and propylene; maleic acid anhydride; acrylonitrile; itaconic acid; styrene; vinylidene chloride and vinyl ether.

In the suspension polymerization according to the present invention, the feed ratio of each of the components, the order of feeding each of the components and polymerization temperature are each not specifically limited, but are suitably selected from the conditions that have heretofore been adopted in the suspension polymerization of the vinyl compound such as vinyl chloride. There is also preferably used a method in which the vinyl compound is heated prior to the feeding of the vinyl compound into the polymerization vessel.

In the suspension polymerization according to the present invention, there is also preferably used a method in which an aqueous medium heated to a temperature of at least 40° C., preferably at least 70° C. is fed into the polymerization vessel prior to the start of the polymerization to enhance the production efficiency.

In the following, some description will be given of the PVA(B) to be added in the polymerization vessel when the polymerization conversion is in the range of 30 to 90%. The PVA has a degree of hydrolysis of at most 85 mol %, preferably 40 to 82 mol %, more preferably 55 to 75 mol %, particularly preferably 60 to 73 mol %. In the case where a modifying group is introduced in the PVA, the modifying group is not taken into account in determining the degree of hydrolysis. That is to say, the degree of hydrolysis is determined only from the vinyl ester group and the vinyl alcohol group. The PVA has a viscosity-average degree of polymerization (hereinafter referred to as "degree of polymerization") of preferably 50 to 2500, more preferably 70 to 1500, still more preferably 100 to 700, particularly preferably 150 to 550.

The PVA is obtained by hydrolyzing a PVES by the use of a hydrolysis catalyst. The vinyl ester is exemplified by vinyl formate, vinyl acetate, vinyl propionate and vinyl pivalate, among which vinyl acetate is particularly preferable. As a hydrolysis catalyst, a publicly known acid or alkali is used.

The PVA can be further improved in its performance by introducing therein, an ionic group or the like. The ionic group is exemplified by an anionic group and a cationic group such as sulfonic group, amino group, ammonium group and carboxyl group. The content of the ionic group in the PVA is preferably 0.01 to 10 mol %, more preferably 0.1 to 2 mol %. A method for introducing the ionic group in the PVA is not specifically limited, but may be a method in which a copolymer of a monomer having an ionic group and a vinyl ester is partially hydrolyzed.

A monomer having a sulfonic group is exemplified by ethylenesulfonic acid, (meth)allylsulfonic acid, sulfoalkyl maleate, sulfoalkyl (meth)acrylamide, sulfoalkyl (meth) acrylate, acrylamide-2-methylpropanesulfonic acid and salts thereof.

A monomer having an amino group or an ammonium group is exemplified by N-(1,1-dimethyl-3-dimethylaminopropyl) (meth)acrylamide, N-(1,l-dimethyl-3-dimethylaminobutyl) (meth)acrylamide, N-vinylimidazole, 2-methyl-N-vinylimidazole, vinyl-3-dimethylaminopropyl ether, vinyl-2-dimethylaminoethyl ether, allyl-3-dimethylaminopropyl ether, allyldimethylamine, methallyldimethylamine and a monomer obtained by subjecting the above monomer to quaternary treatment.

A monomer having a carboxyl group is exemplified by crotonic acid, maleic acid, fumaric acid, itaconic acid and (meth)acrylic acid.

There is also usable a PVA having an ionic group at an end thereof which is obtained by polymerizing a vinyl ester monomer such as vinyl acetate in the presence of a thiol compound such as thiolacetic acid, mercaptopropionic acid and sodium salt of 3-mercapto-1-propanesulfonic acid, and hydrolyzing the resultant polymer.

The PVA may be copolymerized with a copolymerizable ethylenically unsaturated monomer to the extent that the working effect of the present invention is not impaired. Examples of the ethylenically unsaturated monomer include ethylene, acrylonitrile, methacrylonitrile, ethylvinyl ether, butylvinyl ether, N-vinylpyrrolidone, vinyl chloride, vinyl bromide, vinyl fluoride, vinylidene chloride, vinylidene fluoride and tetrafluoroethylene. The content of the ethylenically unsaturated monomer in the PVA is usually preferably at most 10 mol %.

The PVA may have at a side chain thereof, a hydroxyalkyl group having 2 to 20 carbon atoms. A monomer having at a side chain thereof, a hydroxyalkyl group having 2 to 20 carbon atoms is exemplified by 3-butene-1-ol, 4-pentene-1-ol, 5-hexene-1-ol, 7-octene-1-ol, 9-decene-1-ol and 11-dodecene-1-ol. In addition to the above-exemplified monomers, there is also usable a monomer having an ester group which can form a hydroxyl group at the time of hydrolysis reaction of a polyvinyl ester that is the starting raw material for the PVA. The content of the above-mentioned monomer is usually preferably at most 10 mol %.

Moreover, the PVA to be used in the present invention may have a nonionic group, (long-chain) alkyl group or the like in an amount of at most 10 mol %.

The timing of adding the PVA (B) is at a time when the polymerization conversion of the vinyl compound is in the range of 30 to 90%, preferably 40 to 87%, more preferably 50 to 85%, particularly preferably 60 to 80%. In the case where foaming due to dry foam occurs immediately before or immediately after the pressure inside the polymerization vessel begins to fall, it is also preferable to add the PVA(B) at this time, that is, when the pressure just begins to fall.

The method of adding the PVA to the polymerization system is not specifically limited, but is exemplified by a method in which it is added in the form of an aqueous solution, an aqueous dispersion, a solution thereof in an organic solvent such as methanol, mixed solution in methanol and water or the like. The solution of the PVA has a concentration of usually 0.01 to 30% by weight. The temperature of the PVA solution is not specifically limited, but may be room temperature or raised to the polymerization temperature.

The amount of the PVA to be added to the vinyl compound is 0.001 to 0.5, preferably 0.01 to 0.1 part by weight based on 100 parts by weight of the vinyl compound which is subjected to the suspension polymerization.

In the following, some description will be given of the anti-foaming agent for the suspension polymerization of the vinyl compound.

The anti-foaming agent for the suspension polymerization of the vinyl compound is exemplified by the above-described PVA(B), of which a water-soluble PVA having a degree of hydrolysis of at most 85 mol % and a degree of polymerization of at most 2,500.

The PVA to be used as the anti-foaming agent for the suspension polymerization of the vinyl compound needs to be water-soluble. In the case where the PVA(B) has a degree of hydrolysis of less than 70 mol %, it is necessary to make the PVA(B) water-soluble, for example, by introducing an ionic group therein. The term "water-soluble" means that an aqueous solution of the PVA with a concentration of 4% by weight is transparent at 20° C.

According to the present invention, there is provided a process for producing a vinyl resin having a high bulk density, which is excellent in anti-foaming effect against the dry foam being generated in the middle to latter period of the suspension polymerization in a polymerization vessel equipped with a reflux condenser which is excellent in productivity.

In the following, the present invention will be described in more detail with reference to comparative examples and working examples, which however shall not restrict the present invention thereto. In the following examples, % and parts are each based on weight unless otherwise noted in particular.

Examples 1 to 23 and Comparative Examples 1 to 6

Into a polymerization vessel having a height of 125 cm equipped with a reflux condenser were fed one part of an aqueous solution of 0.08 part of PVA(A) having a degree of hydrolysis of 72 mol % and a degree of polymerization of 720 in deionized water and one part of an aqueous solution of 0.03 part of PVES having sodium sulfonate group in a content of 0.8 mol %, a degree of hydrolysis of 35 mol % and a degree of polymerization of 300 in deionized water.

Subsequently, 0.04 part of a 70% solution of diisopropyl peroxydicarbonate in toluene (hereinafter referred to as "initiator solution") was fed into the polymerization vessel, and the oxygen in the vessel was removed by vacuum to a reduced pressure of 50 mmHg. Thereafter, 39 parts of hot water at 80° C. and 30 parts of VCM were simultaneously fed into the vessel under stirring. At the time of completion of the feeding, the liquid level in the vessel was 75 cm high from the bottom thereof, and the temperature inside the vessel was 57° C. When the polymerization was initiated, the pressure inside the vessel was 7.0 kg/cm$^2$G. The suspension polymerization of the VCM was continued by regulating the temperatures of water through the reflux condenser and the cooling jacket of the vessel so as to maintain the temperature inside the vessel at 57° C. At each time when the polymerization conversion reached each of the values as shown in Tables 1 to 3, the PVA(B) as the anti-foaming agent as shown in Tables 1 to 3 was added into the vessel.

When the pressure inside the vessel dropped to 4.0 kg/cm$^2$G after the lapse of 5 hours from the start of the polymerization, the polymerization reaction was discontinued. As a result, the polymerization conversion was 92%, the amount of the polymerization reaction heat which was removed by the reflux condenser was 45% of the total polymerization reaction heat, and the obtained PVC had an average degree of polymerization of 1030.

Evaluations were made of the generation state of the dry foam in the polymerization vessel and the performance of the resultant PVC by the following respective methods. The results are given in Tables 1 to 3.

Generation State of the Dry Foam in the Polymerization Vessel

After the completion of the polymerization and prior to the discharge of the unreacted VCM, observation was made of the generation state of the dry foam in the polymerization vessel through the observation window at the side wall of the vessel. Thus measurement was made of the height from the liquid level to the highest level of the dry foam.

Bulk Density of PVC

Bulk density of PVC was measured according to JIS K6721-1959.

TABLE 1

| | PVA (anti-foaming agent) | | | | | Height of | |
| | | Comonomer | | | | dry foam in | |
| | Degree of hydrolysis (mol %) | Degree of polymerization | Nomenclature | Degree of modification (mol %) | Amount added (% based on VCM) | Conversion at addition (%) | polymerization vessel (cm) | Bulk density of vinyl chloride resin |
|---|---|---|---|---|---|---|---|---|
| Example 1 | 10 | 1000 | AMPS[1] | 2.0 | 0.008 | 32 | 7.0 | 0.538 |
| Example 2 | 36 | 1100 | " | 2.0 | 0.008 | 36 | 5.2 | 0.540 |
| Example 3 | 42 | 980 | " | 2.0 | 0.01 | 38 | 4.3 | 0.541 |
| Example 4 | 53 | 1030 | " | 2.0 | 0.02 | 50 | 2.6 | 0.540 |
| Example 5 | 58 | 890 | " | 2.0 | 0.02 | 55 | 1.5 | 0.543 |
| Example 6 | 61 | 1150 | " | 2.0 | 0.02 | 60 | 1.0 | 0.547 |
| Example 7 | 72 | 1015 | " | 2.0 | 0.02 | 70 | 0.8 | 0.542 |
| Example 8 | 74 | 990 | " | 2.0 | 0.02 | 75 | 2.0 | 0.549 |
| Example 9 | 78 | 1180 | MPSNa[2] | one end[7] | 0.02 | 80 | 3.8 | 0.547 |
| Example 10 | 82 | 1050 | " | one end[7] | 0.1 | 82 | 5.2 | 0.546 |
| Example 11 | 84 | 975 | — | 0 | 0.4 | 83 | 5.9 | 0.545 |
| Example 12 | 72 | 2380 | MAPTAC[3] | 2.5 | 0.02 | 65 | 6.0 | 0.548 |
| Example 13 | 72 | 1600 | — | 0 | 0.02 | 65 | 4.8 | 0.543 |
| Example 14 | 73 | 1450 | — | 0 | 0.02 | 65 | 4.2 | 0.547 |

Remarks
[1] AMPS: sodium 2-acrylamide-2-methylpropanesulfonate
[2] MPSNa: sodium 3-mercapto-1-propanesulfonate
[3] MAPTAC: 3-methacrylamidepropyltrimethylammonium chloride
[7] one end: modified only at one end of PVA

TABLE 2

| | PVA (anti-foaming agent) | | | | | Height of | |
| | | Comonomer | | | | dry foam in | |
| | Degree of hydrolysis (mol %) | Degree of polymerization | Nomenclature | Degree of modification (mol %) | Amount added (% based on VCM) | Conversion at addition (%) | polymerization vessel (cm) | Bulk density of vinyl chloride resin |
|---|---|---|---|---|---|---|---|---|
| Example 15 | 70 | 850 | 70EA[4] AMPS[1] | 1.0 3.0 | 0.02 | 65 | 2.9 | 0.545 |
| Example 16 | 62 | 680 | ethylene AMPS[1] | 2.0 4.0 | 0.02 | 65 | 2.1 | 0.545 |
| Example 17 | 68 | 520 | itaconic acid | 1.0 | 0.02 | 65 | 0 | 0.542 |
| Example 18 | 72 | 350 | MP[5] | one end[7] | 0.02 | 65 | 0 | 0.548 |
| Example 19 | 70 | 200 | " | one end[7] | 0.02 | 65 | 0 | 0.543 |
| Example 20 | 71 | 155 | MPSNa[2] | one end[7] | 0.02 | 65 | 0 | 0.546 |
| Example 21 | 73 | 120 | AMPS[1] | 3.0 | 0.02 | 65 | 2.0 | 0.547 |
| Example 22 | 63 | 40 | MPSNa[2] | one end[7] | 0.02 | 65 | 3.2 | 0.544 |
| Example 23 | 80 | 400 | — | 0 | 0.02 | 65 | 3.5 | 0.547 |

Remarks
[1] AMPS: sodium 2-acrylamide-2-methylpropanesulfonate
[2] MPSNa: sodium 3-mercapto-1-propanesulfonate
[4] 7OEA: 7-octene-1-ol
[5] MP: 3-mercaptopropionic acid
[7] one end: modified only at one end of PVA

Comparative Examples 7 & 8

The procedure in Examples 1 to 23 was repeated to carry out the suspension polymerization of VCM except that the running of the reflux condenser was stopped, thus removing the polymerization reaction heat by only using the cooling jacket of the polymerization vessel, and that the feed amount of the "initiator solution" was changed to 0.033 part (instead of 0.04 part) so as to be able to remove the polymerization reaction heat. At each time when the polymerization conversion reached each of the values as shown in Table 3, the PVA(B) as the anti-foaming agent as shown in Table 3 was added into the vessel.

When the pressure inside the vessel dropped to 4.0 kg/cm²G after the lapse of 9 hours from the start of the polymerization, the polymerization reaction was discontinued. As a result, the polymerization conversion was 92%, the amount of the polymerization reaction heat which was removed by the reflux condenser was 0% of the total polymerization reaction heat, and the obtained PVC had an average degree of polymerization of 1050.

The methods same as in Examples 1 to 23 were applied to evaluate the generation state of the dry foam in the polymerization vessel and the performance of the resultant PVC. The results are given in Table 3.

TABLE 3

| | PVA (anti-foaming agent) | | | | | | Height of dry foam in polymerization vessel (cm) | |
| | | | Comonomer | | | | | |
| | Degree of hydrolysis (mol %) | Degree of polymerization | Nomenclature | Degree of modification (mol %) | Amount added (% based on VCM) | Conversion at addition (%) | | Bulk density of vinyl chloride resin |
|---|---|---|---|---|---|---|---|---|
| Comparative Example 1 | 70 | 1100 | — | 0 | 0.02 | 28 | 28 | 0.503 |
| Comparative Example 2 | 86 | 2550 | — | 0 | 0.02 | 70 | 20 | 0.542 |
| Comparative Example 3 | 95 | 700 | — | 0 | 0.02 | 70 | (*1) | 0.502 |
| Comparative Example 4 | 35 | 300 | — | 0 | 0.005[6)] | 25 | 35 | 0.483 |
| Comparative Example 5 | 40 | 300 | dimethylpolysiloxane | 0 | 0.025[6)] 0.025[6)] | 5 | 25 | 0.528 |
| Comparative Example 6 | | | not added | | 0 | — | (*1) | 0.545 |
| Comparative Example 7 | 72 | 1000 | — | 0 | 0.02 | 45 | 1.8 | 0.535 |
| Comparative Example 8 | | | not added | | 0 | — | 2.1 | 0.538 |

Remarks
[6)]Because of its being water-insoluble, it was fed by dissolving it in a mixed solvent of water/methanol (1/1)
(*1) Reflux condenser was plugged up with PVC.

What is claimed is:

1. A process for producing a vinyl resin, comprising:

polymerizing a suspension of at least one vinyl compound in the presence of 0.01 to 1 part by weight, based on 100 parts by weight of said vinyl compound, of a suspending agent, and adding, when the polymerization conversion of said vinyl compound is in the range of 30 to 80%, 0.001 to 0.5 part by weight, based on 100 parts by weight of said vinyl compound, of a polyvinyl alcohol having a degree of hydrolysis of 40 to 85 mol % and a viscosity-average degree of polymerization of 70 to 1500, wherein the polymerization reaction is conducted in a vessel comprising a reflux condenser, and a portion of the polymerization reaction heat is removed by said reflux condenser.

2. The process of claim 1, wherein an aqueous medium having a temperature of at least 40° C. is fed into the vessel prior to the start of the polymerizing step.

3. The process of claim 1, wherein said polyvinyl alcohol is added when the polymerization conversion of said vinyl compound is 65 to 80%.

4. The process of claim 1, wherein said polyvinyl alcohol is added when the polymerization conversion of said vinyl compound is 40 to 87%.

5. The process of claim 1, wherein said polyvinyl alcohol is added when the polymerization conversion of said vinyl compound is 50 to 85%.

6. The process of claim 1, wherein said polyvinyl alcohol is added when the polymerization conversion of said vinyl compound is 60 to 80%.

7. The process of claim 1 wherein said polyvinyl alcohol has a viscosity-average degree of polymerization of 100 to 700.

8. The process of claim 1, wherein said polyvinyl alcohol has a viscosity-average degree of polymerization of 150 to 550.

9. The process of claim 1, wherein said polyvinyl alcohol comprises at least one other polymerized monomer therein in addition to polymerized vinyl alcohol.

* * * * *